May 8, 1962 W. H. FENGLER 3,032,881

CONTOUR-REPRODUCING APPARATUS

Filed Sept. 18, 1957 6 Sheets-Sheet 1

INVENTOR.
Werner H Fengler
Barthel & Bugbee
Attys

CONTOUR-REPRODUCING APPARATUS

Filed Sept. 18, 1957

6 Sheets-Sheet 2

INVENTOR.
Werner H. Fengler
BY Barthel & Bugbee
Attys

May 8, 1962 W. H. FENGLER 3,032,881

CONTOUR-REPRODUCING APPARATUS

Filed Sept. 18, 1957

6 Sheets-Sheet 3

INVENTOR.
Werner H. Fengler
BY Barthel & Bugbee
Attys

INVENTOR.
Werner H. Fengler
BY Barthel + Bugbee.
Attys

INVENTOR.
Werner H. Fengler
BY Barthel + Bugbee
Attys

INVENTOR.
Werner H. Fengler
BY Barthel + Bugbee
Attys

United States Patent Office 3,032,881

Patented May 8, 1962

3,032,881

CONTOUR-REPRODUCING APPARATUS

Werner H. Fengler, 23651 Fordson Drive, Dearborn, Mich.

Filed Sept. 18, 1957, Ser. No. 684,696
17 Claims. (Cl. 33—23)

This invention relates to geometrical instruments and, in particular, to contour reproducing and recording apparatus.

One object of this invention is to provide a contour reproducing apparatus which is adapted to quickly and accurately trace the contours of a three-dimensional object, such as an automobile body model, and reproduce them upon a two-dimensional surface, such as a drawing sheet and, conversely, to reproduce the outline of certain structural features set forth in a two-dimensional drawing upon a three-dimensional model to conform the latter to the former.

Another object is to provide a contour reproducing apparatus of the foreging character wherein the model or other object the contours of which are to be reproduced upon a drawing sheet or vice versa, is mounted upon a table or model supporting structure having an upstanding structure or gantry associated therewith and carrying a vertically and horizontally movable carriage provided with a sensing device having a very light touch-responsive sensing probe or a proximity feeler which is connected through suitable electrical interconnecting controlling means to a motion-reproducing device having a scriber resting on a drawing sheet and moved over the drawing sheet in response to the motion of the sensing probe as the carriage is moved over the object in a predetermined path, thereby reproducing upon the drawing sheet the outline characteristics of the intersection of a geometrical plane with the object in the plane of travel of the sensing element.

Another object is to provide a contour reproducing apparatus of the foregoing character wherein the object-supporting structure is maintained in a relatively stationary position and the upstanding structure is reciprocated relatively to the framework along a rectilinear guideway, such as guide tracks.

Another object is to provide a contour reproducing apparatus of the foregoing character wherein the sensing device and carriage motion are controlled automatically by electrical controlling devices which are responsive to the motion of the sending device and probe over the object for reversibly controlling a motor which moves the sensing device toward or away from the object to and fro to maintain it in precise contact with the object surface as the carriage is moved along the object either vertically or horizontally, as the case may be.

Another object is to provide a contour reproducing apparatus of the foregoing character wherein the apparatus is provided with a line-following device adapted to be inserted therein in place of the scriber and operative to follow the paths of the lines in a drawing and, through a reversal of the above-described motion, reproduce such paths upon a model or other object of workable material by means of a suitable milling or routing cutter so as to impart to the object the contour established by the lines on the drawing.

Another object is to provide a contour reproducing apparatus of the foregoing character which is adapted to successively reproduce, upon a drawing sheet, contours existing in the object at different predetermined horizontal, vertical or oblique planes at predetermined spacings from one another so that from a given object the contours in such planes may be transferred to a two-dimensional drawing sheet or sheets or transferred back from a set of such drawing contour lines to an object in order to create a three-dimensional object from two-dimensional drawings or to revise the configuration of a given object from changes made in the drawings, as desired.

Another object is to provide a modified contour reproducing apparatus of the foregoing general character wherein the upstanding framework is maintained in a relatively stationary position and the model-supporting table is reciprocated relatively to the framework along a rectilinear guideway, such as guide tracks.

Another object is to provide a further modified contour-reproducing apparatus as set forth in the object immediately preceding, wherein the model-supporting table carries a turntable upon which the model can be turned in order to obtain or establish the contours of the model in oblique or transverse planes.

Another object is to provide a modified contour-reproducing apparatus of the foregoing general character wherein the apparatus is provided with a tape or wire recorder device in which either the contours of the model being traced are recorded electrically on a suitable tape, or the lines on a drawing sheet are similarly recorded electrically on a suitable tape of the continuous signal type used for programming machine automation installations without the necessity for interpolation or processing through computers or preparing conventional punched or perforated tapes, so that the recorded impressions or information can be stored and applied at some future date or in a different location to the making of a drawing of such contours or the shaping of a model having the contours recorded and stored from the drawings.

Another object is to provide a modified contour reproducing apparatus of the foregoing general character wherein the scale of the contours being traced from the model onto the drawings or the contour being shaped onto the model from drawings is changed electrically or mechanically in order to produce an enlarged or reduced size drawing or model, as the case may be.

Other objects and advantages of the invention will become apparent during the course of the following description of the accompanying drawings, wherein.

Figures 2, 5, 6, 13:
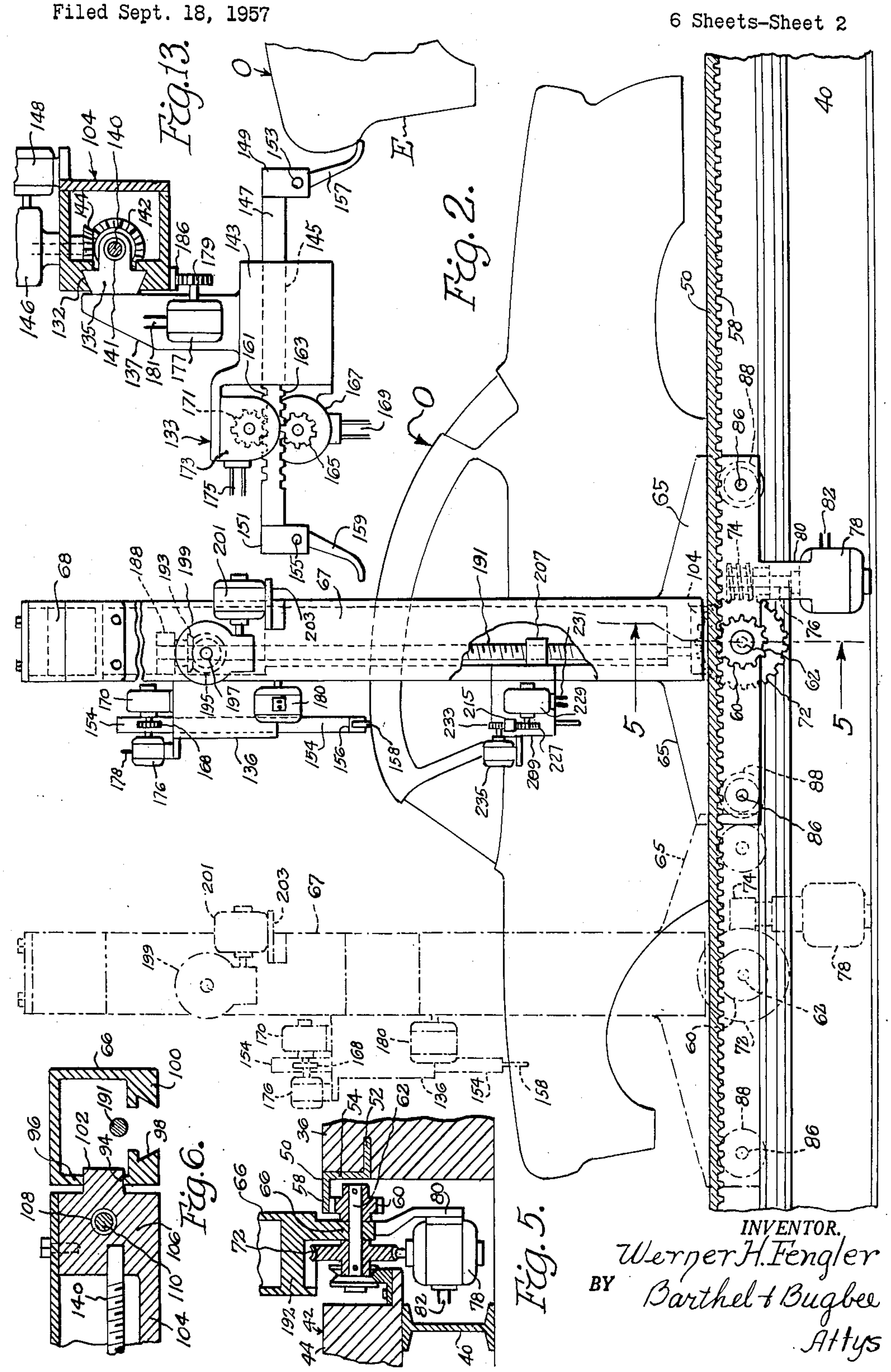
FIGURE 2 is a side elevation of the object-contacting unit of FIGURE 1, with the stationary longitudinal gantry-driving rack in vertical section taken along the line 2—2 in FIGURE 3 with the shifted position of the gantry shown in dotted lines.
FIGURE 5 is a fragmentary vertical section through the gantry-driving mechanism taken along the line 5—5 in FIGURE 2.
FIGURE 6 is a fragmentary horizontal section through one of the gantry uprights and adjacent end of the gantry cross beam showing the guiding connection therebetween.
Figures 3, 4:
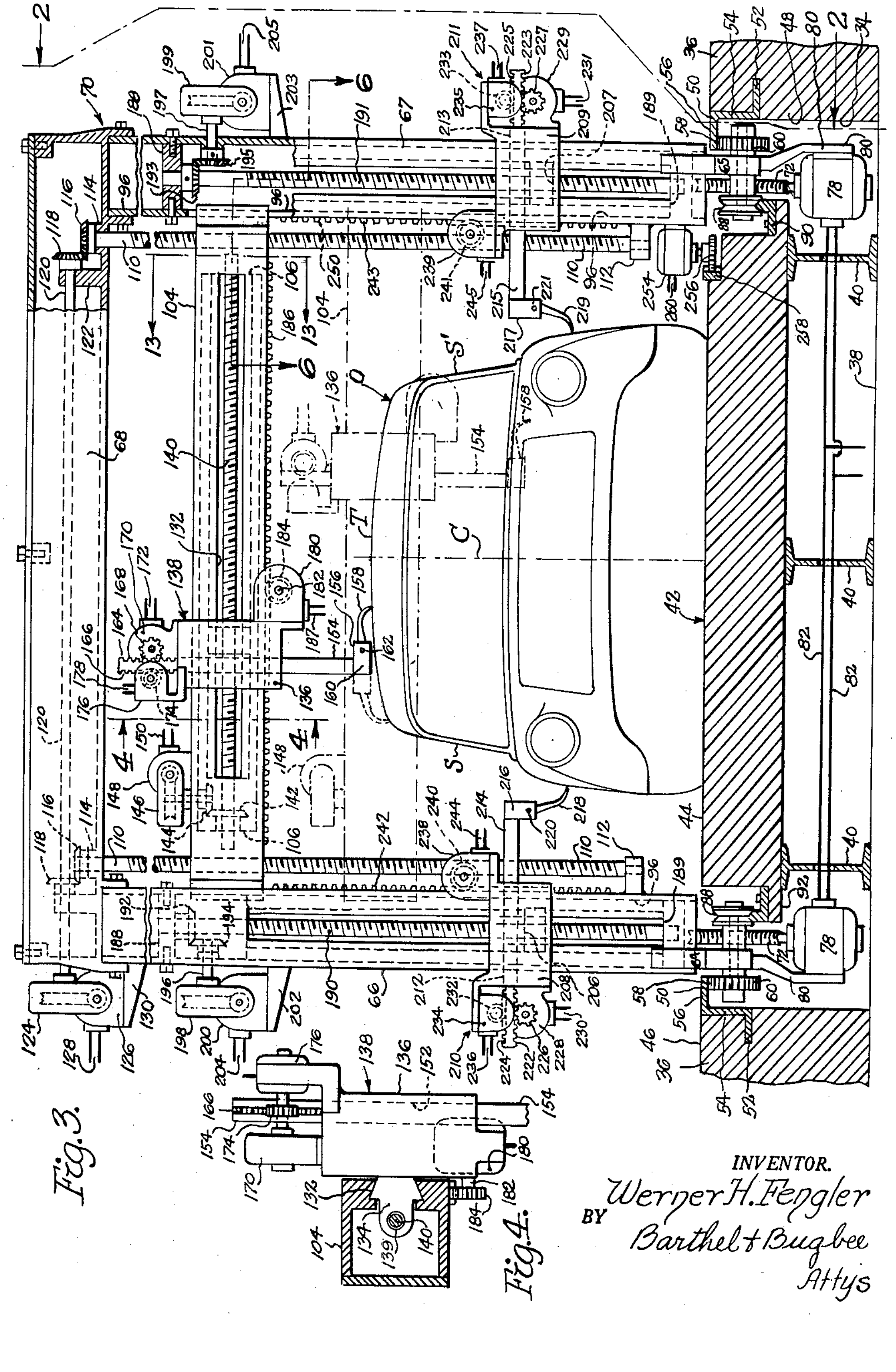
FIGURE 3 is a cross-section, mainly in front elevation, through the object-contacting unit of FIGURES 1 and 2, taken along the line 3—3 in FIGURE 1.
FIGURE 4 is a fragmentary vertical section through the sensing device carriage and cross beam, taken along the line 4—4 in FIGURE 3.
Figure 9:
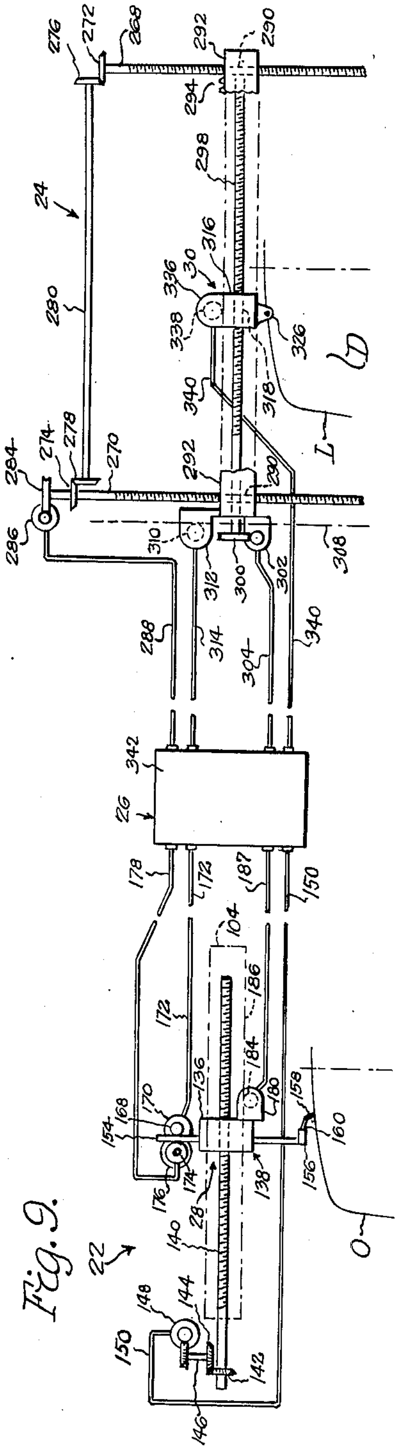
FIGURE 9 is a diagrammatic view of the mechanical and electrical circuit interconnecting the sensing device of the object-contacting unit and the scribing device of the drawing-contacting unit while the probe is tracing the generally horizontal transverse contour of the object.
Figure 12:
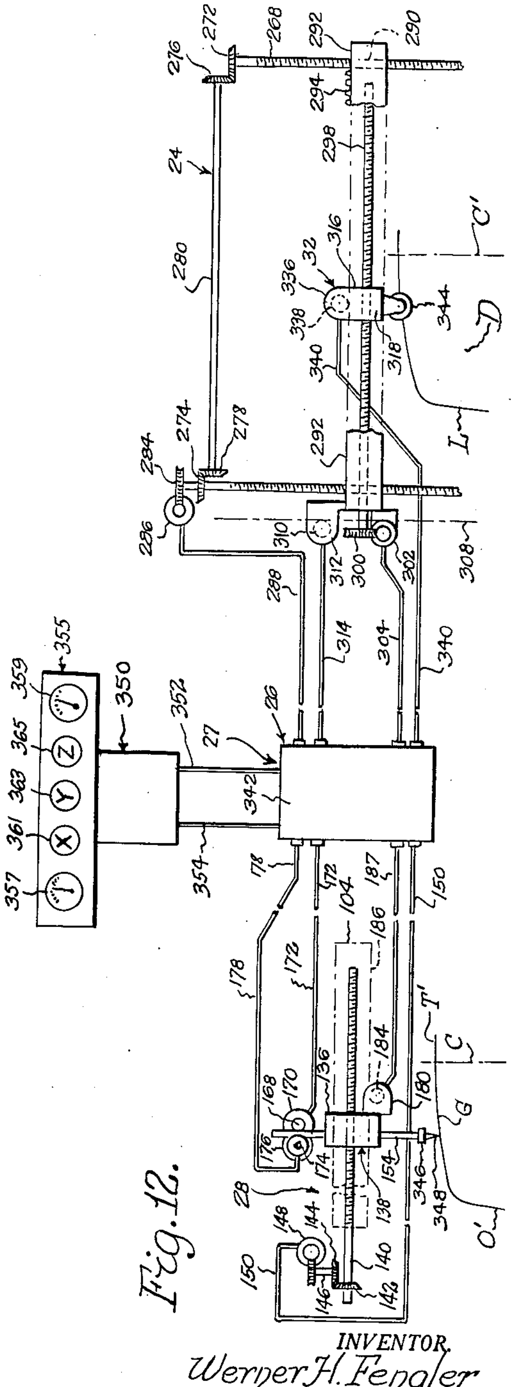
Figures 10, 11, 14:
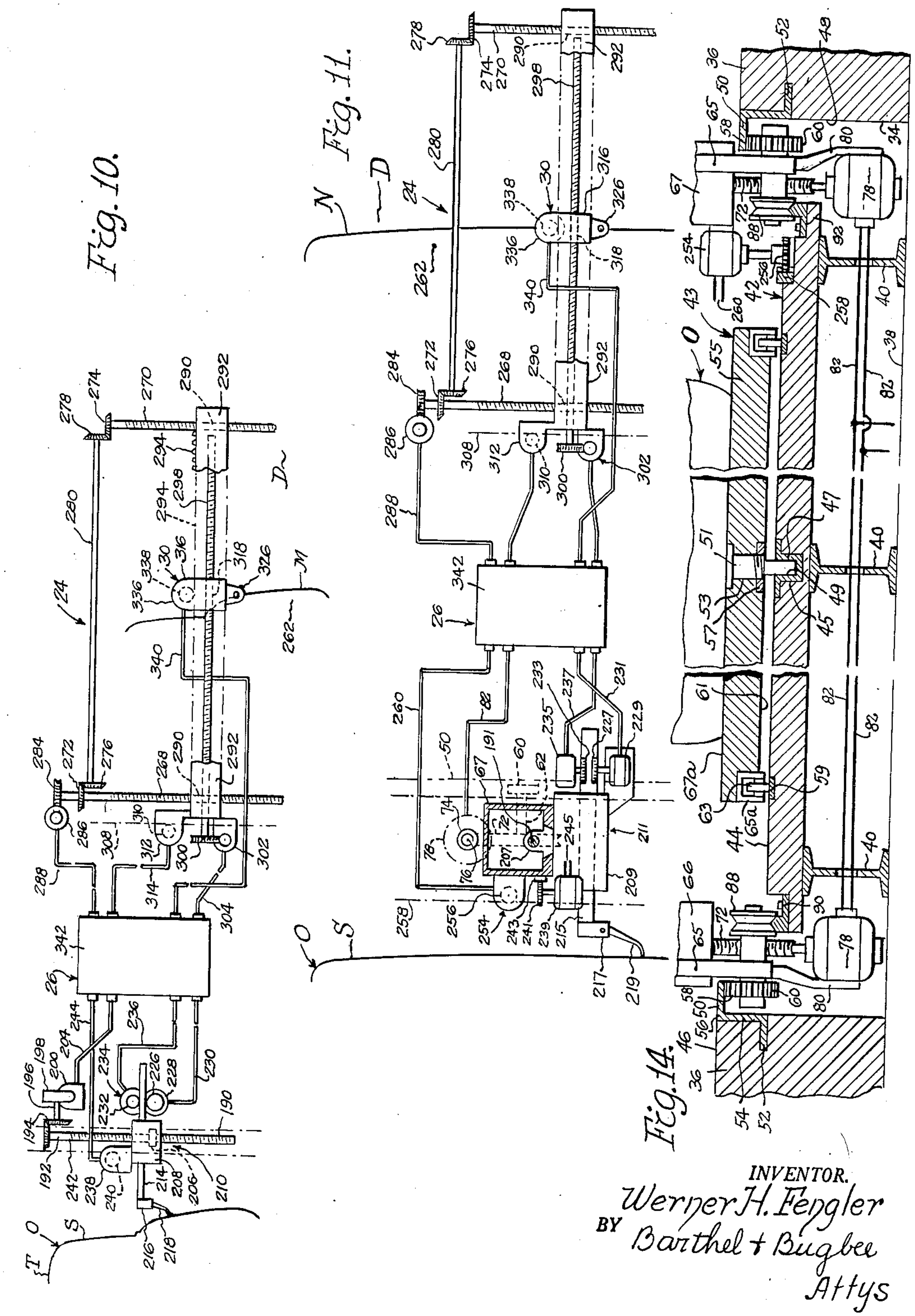
FIGURE 10 is a diagrammatic view similar to FIGURE 9 but showing the arrangement of the mechanical and electrical circuit while the probe is tracing the vertical contour of the object.
FIGURE 11 is a diagrammatic view similar to FIGURES 9 and 10 but showing the arrangement of the electrical and mechanical circuit while the probe is tracing the longitudinal horizontal contour of the object.

FIGURE 12 is a diagrammatic view similar to FIGURES 9 to 11 inclusive but showing the reversed arrangement of the mechanical and electrical circuit wherein a contour line on a drawing is being scanned by a line-following device and its path either transmitted through an interconnecting-controlling unit to a motion-reproducing unit having a stylus or cutter imparting that contour to the object or recorded on an electro-magnetic tape recorder;

FIGURE 13 is a side elevation of a model end contour sensing carriage optionally mounted on the cross beam as shown in dotted lines near the right-hand side of FIGURE 3, with the cross beam in cross-section, taken along the line 13—13 in FIGURE 3; and FIGURE 14 is a fragmentary cross-section of a further modification of the lower portion of FIGURE 3 wherein the model-supporting table is provided with a turntable enabling the model to be traced or contoured in oblique planes.

*General Arrangement*

Hitherto, in industries where objects such as model of articles proposed to be manufactured have been first constructed in order to visualize the appearance of the proposed article, it has been very difficult to translate an approved model into suitable drawings by which the article may be manufactured or from which desirable changes may be perceived and carried into effect. This is particularly true of the automobile industry wherein the full-sized models in clay of proposed automobile body designs have been approved and full-sized patterns, dies, templates, assembly fixtures and welding equipment are to be manufactured in order to make a prototype and subsequently to mass produce the automobile body upon an assembly line. Under previously existing procedures, wherein the contours of the body are laboriously reproduced by hand upon drawings by draftsmen, and many months of tedious work were required to produce such a prototype from which the top management of the company could render final approval or make desired changes prior to setting up tooling for final manufacture. This prior procedure has been further complicated by the necessity of occasionally making changes in the approved model in order to accommodate the machinery or comfortably seat and afford ingress and egress for the passengers. Such engineering changes, when made following approval of the model, have required alteration of the model and of the drawings made therefrom in order to visualize the changed appearance and determine whether it is still satisfactory.

The present invention provides an apparatus in which an object such as the full-sized model may be placed and its contours rapidly and precisely traced by a sensing device in spaced horizontal and vertical planes, and these contours transferred to drawings by a scribing device in an automatic manner such that once the apparatus is started in operation, it requires only nominal attention and control by the operator in order to produce these drawings, which usually consist of families of curves representing contours in different planes of the model. By the apparatus of the present invention, moreover, the lines on the drawings can be transmitted back to the model and applied to the model by means of a stylus or cutter actuated by substantially the same mechanical and electrical motion-reproducing system using a so-called line-following device at the transmitting end and a stylus or cutter replacing the model-contacting probe or feeler used in the reverse procedure of making drawings from the model.

Figures 7, 8:
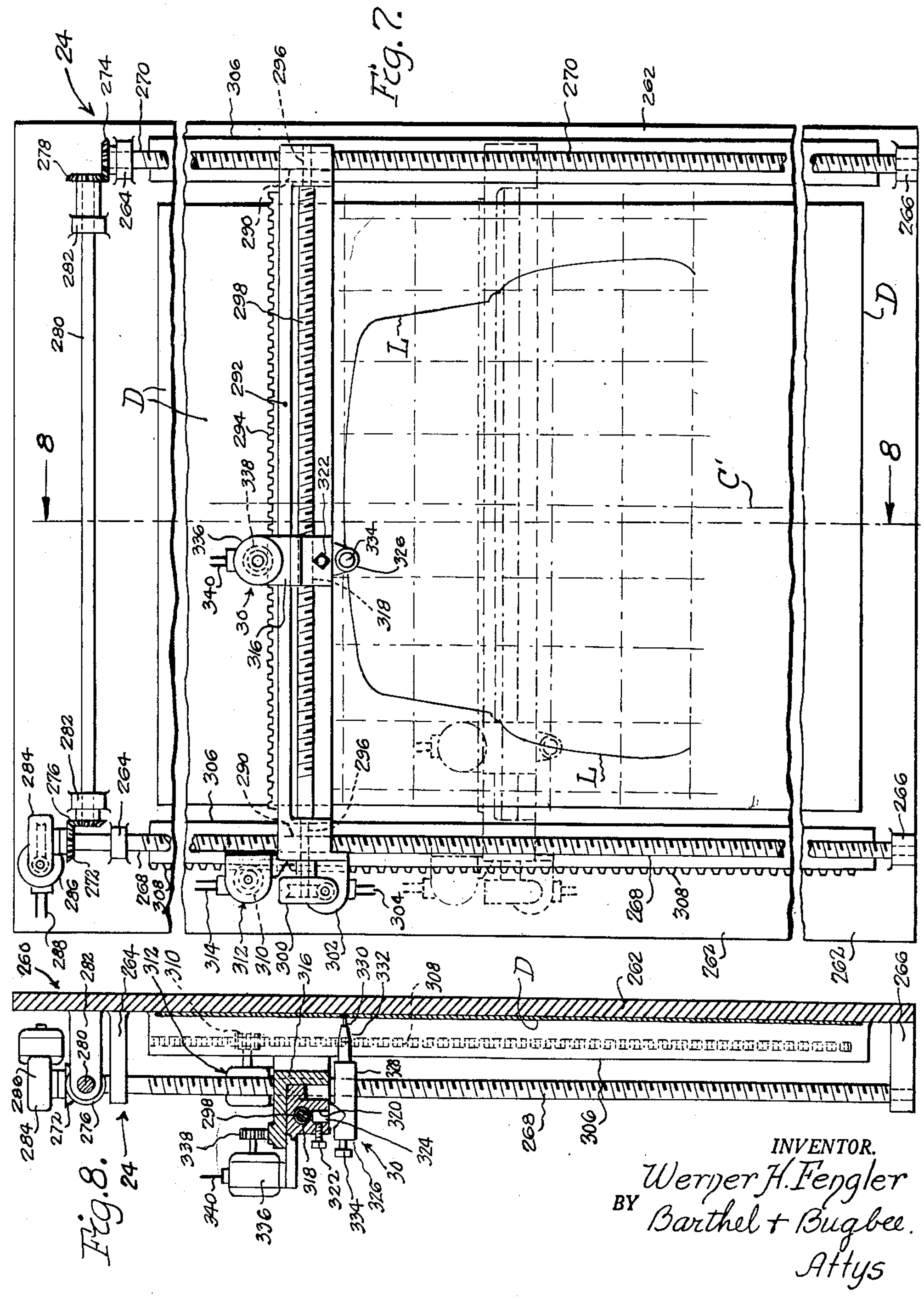
FIGURE 7 is a front elevation of the drawing-contacting unit of the contour-reproducing apparatus shown in FIGURE 1, with a drawing sheet thereon bearing the scribed reproduction of the vertical section of the object shown being traced in FIGURE 3.
FIGURE 8 is a vertical section taken along the line 8—8 in FIGURE 7.

Referring to the drawings in detail, the drawings show a contour reproducing apparatus, generally designated 20, arranged in three general units connected to one another, namely, an object-contacting unit, generally designated 22, shown in FIGURES 1 to 6 inclusive, a drawing-contacting unit, generally designated 24, shown in FIGURES 7 and 8, and an interconnecting-controlling unit, generally designated 26, shown in FIGURES 9, 10 and 11. The contour-reproducing apparatus 20 is readily convertible from an object-to-drawing contour-reproducing arrangement of FIGURES 9 to 11 inclusive to the drawing-to-object contour-reproducing arrangement, generally designated 28, shown in FIGURE 12, as explained below in connection with the operation of the invention. It will be understood that the drawing-to-object contour-reproducing arrangemnt 28 by the conversion described below may also be designated as the object-shaping or contour-establishing apparatus 28 since it automatically imparts to the object O contour lines or grooves G determined by contour lines L on sets of drawings which represent the contours desired for the object at spaced selected intervals in both horizontal and vertical planes. In performing this conversion, the scribing device, generally designated 30, of the contour-reproducing apparatus 24 is replaced by a conventional so-called line-following device, generally designated 32, shown in FIGURE 12 and containing an optical-photo-electric scanning system connected to an electronic circuit, as explained more fully below.

*Object-Contacting Unit*

The object-contacting unit 22 (FIGURES 1 to 6 inclusive) is shown (FIGURE 3) as mounted in a recess 34 in the concrete floor 36 of a suitable building (not shown), the bottom surface 38 of the recess 34 forming a continuation of the concrete floor 36. Disposed on the recess 34, which is in the form of an elongated rectangular box-shaped depression, are three or more elongated structural members 40 (FIGURES 2 and 3) shown as conventional structural steel I-beams which, in turn, sustain an object-supporting structure or table 42 of steel or other suitable material. The table 42 is also longitudinally elongated so as to fit into the recess 34 with its upper surface 44 substantially flush with the upper surface 46 of the floor 36.

As shown in FIGURE 14, the object-supporting structure or table 42 is optionally provided with a turntable, generally designated 43, for directly and rotatably supporting the object or model O in order to enable it to be turned so that contours may be traced or shaped in oblique or transverse planes without otherwise altering the apparatus 22. For this purpose, the object-supporting table 42 is centrally bored as at 45 to receive a vertical turntable bearing 47 having a bore 49 in which a vertical pivot shaft 51 is rotatably mounted. The pivot shaft 51 is mounted in a central vertical bore 53 in the turntable disc 55 and secured thereto as at 57. The table 42 is preferably provided with a circular track 59 of annular form with its center coinciding with the axis of rotation of the turntable shaft 51 and preferably countersunk into the top surface 44 of the table 42 so as to be flush with that surface. The bottom surface 61 of the turntable 43 is spaced slightly above the top surface 44 of the table 42 and guide rollers 63 are mounted near the periphery of the turntable disc 54 on brackets or mounts 65*a* secured to the lower side of the turntable disc 55 and preferably recessed into its lower surface 61. The model or other object O to be traced or contoured is mounted on the upper surface 67*a* of the turntable disc 55, which can then be rotated either by hand or by power mechanism (not shown) and locked in any desired position by lock bolt or other suitable means (not shown) in order to present oblique or transverse planes of the model O to the action of the sensing or contouring feelers or tools respectively.

Embedded in the side walls 48 of the recess 34 are Z-section rack beams or rails 50, the lower flange 52 being embedded in the floor 36, the web 54 being flush with the side wall 48 and the upper flange 56 projecting horizontally into and above the recess 34 substantially flush with the floor surface or floor level 46. The upper flange of each rack beam 50 is provided on its under side adjacent its free edge with rack teeth 58 (FIGURE 2). Meshing with the teeth 58 of each rack beam 50 is a driving pinion 60 mounted on a drive shaft 62 (FIGURE 5) journaled in the horizontally-elongated depending base portions 64 and 65 of a pair of spaced uprights or stanchions 66 and 67 of an upright structure or gantry 70 having a tie beam 68 extending between the stanchions 66 and 67 (FIGURE 3).

Keyed, pinned or otherwise secured to each shaft 62 (FIGURE 5) is the hub of a worm gear 72 with which meshes a worm 74 (FIGURE 2) drivingly connected to the output shaft 76 of a vertical motor 78 mounted upon a bracket 80 extending downward from power lines 82 connected through suitable motor-starting and speed-controlling mechanism to a source of electric current, for instance through a conventional amplidyne motor generator set.

Each depending portion 64 is longitudinally-elongated (FIGURE 2) and near its opposite ends carries axles 86 for rotatably supporting grooved wheels 88 running upon upstanding L-section trackways 90 which are bolted or otherwise secured to the opposite side portions 92 of the object-supporting structure or table 42 (FIGURE 2). As a consequence, when the motors 78 are energized, the consequent rotation of the pinions 60 relatively to the stationary rack beams 50 causes the upright structure or qantry 70, supported on the grooved wheels 88 and the base portions 64 and 65 of the uprights or stanchions 66 and 67 to move longitudinally along the guide rails 90 so as to position the gantry 70 at any desired location relatively to the model O upon the supporting structure or table 42.

The uprights 66 and 67 of the upright structure or gantry 70 are of hollow box formation (FIGURE 6) with vertical elongated guideways 94 in their inner walls 96 and with dovetail guideways 98 in the front walls 100 thereof. The tie beam 68 (FIGURE 2) is also of box-shape construction with its opposite ends bolted or otherwise secured to the upper ends of the uprights or stanchions 66 and 67.

Vertically slidable in each of the vertical stanchion guideways 94 is the outer end portion 102 (FIGURE 6) of a vertically-movable cross beam or carriage 104 also of hollow box-shaped construction and having opposite end walls 106 which are bored and threaded at 108 to threadedly engage a vertical screw shaft 110 (FIGURE 3) so that as the screw shafts 110 are rotated, the cross beam 104 rises or falls. The screw shafts 110 are journaled at their lower ends in bearing brackets 112 projecting inwardly from the inner walls 96 of the stanchions 66 whereas their upper ends are journaled in bearing bosses 114 in the tie beam 68 and have keyed or otherwise secured to them bevel pinions 116. The latter mesh with bevel pinions 118 keyed or otherwise drivingly secured to a cross shaft 120 journaled in upstanding bearing brackets 122 within the tie beam 68 of the gantry or upright structure 70. In this manner, the two screw shafts 110, which are parallel to one another, are driven in unison in order to raise or lower the cross beam 104. The cross shaft 120 extends outward through one end of the tie beam 68 to a reduction gear box 124 forming the output of a reversible electric motor 126. The latter is energized from power lines 128 through a conventional speed-controlling power source, such as an amplidyne motor generator set (not shown) and is supported on a bracket 130 secured to one of the uprights or stanchions 66.

The cross beam 104 is provided in one of its vertical side walls with a slotted guideway 132 of dovetail cross-section (FIGURE 4) in which is reciprocably mounted the correspondingly-shaped dovetail slide block 134 connected to and supporting the cross carriage or movable support 136 of a transverse horizontal or X-axis sensing assembly, generally designated 138, which traces the X-axis contour of the model (using the terminology of analytical geometery). The slide block 134 is bored and threaded at 139 to threadedly engage a horizontal screw shaft 140 journaled at its opposite ends in the opposite end walls 106 of the cross beam 104. Keyed or otherwise drivingly secured to the screw shaft 140 near one end thereof is a bevel pinion 142 which meshes with a bevel pinion 144 (FIGURE 3) mounted on the output shaft of a reduction gear set 146 which is in turn connected to the output shaft of a reversible electric motor 148. The latter is mounted on the upper surface of the cross beam 104 and energized from electric power lines 150 through a conventional speed-controlling power source, such as an amplidyne motor generator set (not shown). As a consequence, the rotation of the motor 148, and screw shaft 140 driven thereby causes the cross carriage 136 to travel to and fro horizontally along the cross beam 104, guided by the slide block 134 in the dovetail guideway 132.

Figure 1:
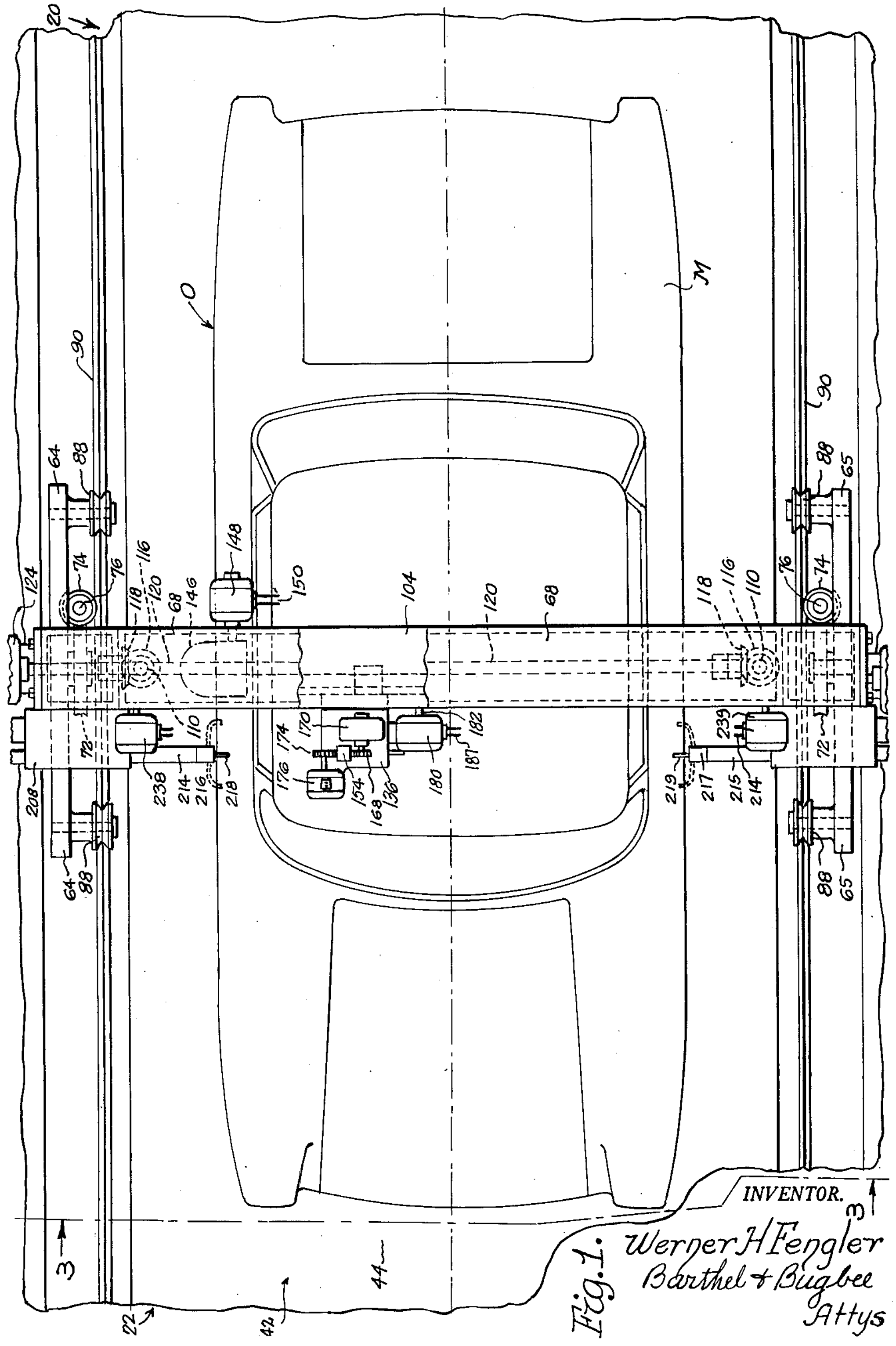
FIGURE 1 is a top plan view of the object-contacting unit of a contour-reproducing apparatus, according to one form of the invention.

The cross carriage 136 is provided with a vertical guide bore 152 (FIGURE 4) preferably of rectangular cross-section and slidably receiving a vertically-reciprocable rack shaft 154 also preferably of corresponding rectangular cross-section (FIGURE 1). The rack shaft 154 at its lower end is provided with a sensing head 156 on which the probe or feeler 158 of a horizontally-moving sensing device, generally designated 160, is pivotally mounted as at 162. The probe 158 is in the form of an arcuate finger, the free end of which engages the upper surface of the object O (FIGURE 3).

The upper end portion of the rack shaft 154, as its name indicates, carries two sets of rack teeth 164 and 166 respectively (FIGURE 3). Meshing with one set of rack teeth 164 is a pinion 168 on the output shaft of a reversible electric motor 170 which is mounted on top of the carriage 136 and energized by power lines 172 through an automatic servo-control circuit in the interconnecting-controlling unit 26 described below. Meshing with the second set of rack teeth 166 is a second pinion 174 mounted on the input shaft of a conventional vertical dimension-reading synchro-transmitter 176 having output lines 178 running by way of the interconnecting-controlling unit 26 (FIGURE 9) to the scribing device 30 of the drawing-contacting unit 24, as described more fully below. Also mounted on the cross-carriage 136 is a conventional horizontal dimension-from-center-reading synchro-transmitter 180, the input shaft 182 (FIGURE 1) of which has keyed or otherwise drivingly secured thereto a pinion 184 (FIGURE 4). The pinion 184 meshes with and is driven by a toothed rack 186 secured to and extending along the lower side of the cross beam 104. Accordingly, as the carriage 136 is moved back and forth along the cross beam 104, the motion thereof is transmitted by the synchro-transmitter 180 through the electrical output lines 187 thereof to the scribing device 30 of the drawing-contacting unit 24 (FIGURES 7 and 8) through the interconnecting-controlling unit 26 more fully described below.

Absolute contact between the probe 158 and the object O is not imperative because electronic contour-following systems are known to electronic engineers and available on the open market, requiring only close proximity of the moving probe to the stationary object, without direct contact therebetween being required. Two such systems are known commercially as the Farrand Inductosyn Linear and Angular Micro Positioning System, Manufactured by Farrand Controls, Inc., 4401 Bronx Blvd., New York 70, N.Y. In these systems, one linear and the other rotary, the conventional synchro components are eliminated, together with the toothed rack 186 and in their place are substituted two closely but precisely spaced metallic patterns, one of which is a stator including a scale attached to a stationary part of the machine and the other a slider which is attached to a moving part of the machine at a spacing of approximately $\frac{5}{1000}$ of an inch apart from one another. The electronic scale and electronic slider are in the form of glass plates including the scale and slider in the form of metallic conductor patterns mounted on the plates, the slider being arranged one quarter cycle out of phase with the stator wherein one cycle extends over one-tenth of an inch of movement. The slider and stator are connected to a conventional electronic circuit supplied by the above-mentioned Farrand company, and the details of this circuit or the stator and slider used therewith are beyond the scope of the present invention. It will therefore be understood in the present specification and claims that where the probe is stated to substantially engage or be in substantial tracing engagement with the object, it means that either direct engagement or close proximity approach tracing are alternative employable.

Optionally mounted on the cross beam 104 for more convenient use in tracing the contours or shaping the contours of the ends of the model or other object O is an object end-contacting unit, generally designated 133 (FIGURE 13). The unit 133 is intended to be mounted on the cross beam 104 near the right-hand end as viewed in FIGURE 3, that is, on the opposite end of the cross beam 104 from the unit 138 described above. The unit 133, like the unit 138, is reciprocably mounted in the slotted guideway 132 of dovetail cross-section in the front of the cross beam 104 by a correspondingly-shaped dovetail slide block 135 connected to and supporting the depending cross-carriage 137 of the auxiliary vertical or Y-axis sensing asembly 133 for tracing or shaping end contours of the model or other object O in both horizontal and vertical contour planes. The slide block 135 is bored and threaded as at 141 to threadedly engage the horizontal screw shaft 140 which, as stated above, is journaled at its opposite ends in the opposite end walls 106 of the cross beam 140 and driven by the bevel pinion 142 from the bevel pinion 144 on the output shaft of the reduction gear set 146 driven by the reversible electric motor 148 resting upon the upper surface of the cross beam 104.

The cross carriage 137 is provided at its lower end with a generally horizontal supporting structure 143 (FIGURE 13) which is disposed substantially perpendicular to the cross beam 104 and is provided with a horizontal guide bore 145 preferably of rectangular cross-section and also disposed substantially perpendicular to the cross beam 104 and its guideway 132. Slidably mounted in the guide bore 145 is a horizontally reciprocable rack shaft 147 also preferably of corresponding rectangular cross-section. The rack shaft 147 at its opposite ends is provided with sensing heads 149 and 151 carrying horizontal pivot pins 153 and 155 upon which are mounted the probes or feelers 157 and 159 respectively. The probes 157 and 159 of the sensing heads 149 and 151 are in the form of arcuate fingers having free ends engageable with the end surface E of the model or other object O.

The upper and lower sides of the rack bar 147 carry two sets of rack teeth 161 and 163 respectively. Meshing with one set of rack teeth 163 is a pinion 165 on the output shaft of a reversible electric motor 167 mounted on the supporting structure 143 and energized by power lines 169 through an automatic servo-control circuit in the interconnecting-controlling unit 26 described below. Meshing with the second set of rack teeth 161 is a second pinion 171 mounted on the input shaft of a conventional synchro-transmitter 173 having output lines 175 running by way of the interconnecting-controlling unit 26 (FIGURE 9) to the scribing device 30 of the drawing-contacting unit 24, as described more fully below.

Also mounted on the cross-carriage 137 (FIGURE 13) is a conventional horizontal synchro-transmitter 177, the input shaft of which has a pinion 179 keyed or otherwise drivingly secured thereto. The pinion 179 meshes with and is driven by the toothed rack 186 which, as stated above, is secured to and extends along the lower side of the cross beam 104, where it also actuates the pinion 184 on the input shaft of the synchro-transmitter 180 mounted on the cross carriage 136 of the sensing assembly 138 described above. Accordingly, as the cross carriage 137 is moved back and forth along the cross beam 104, the motion is transmitted by the synchro-transmitter 177 through the electrical output lines 181 thereof through the interconnecting-controlling unit 26 to the scribing device 30 of the drawing-contacting unit 24 (FIGURES 7 and 8) in a manner similar to the sensing device 138 on the cross-carriage 136, as more fully described below in connection with the operation of the invention.

Each of the uprights or stanchions 66 and 67 of the gantry 70 has mounted thereon vertically-spaced bearing blocks 188 and 189 bored to rotatably receive and support the upper and lower ends of two horizontally-spaced parallel vertical screw shafts 190 and 191, the upper portions of which carry bevel gears 192 and 193 pinned or otherwise drivingly secured thereto. Meshing with each of the bevel gears 192 and 193 is a bevel gear 194 or 195 likewise pinned or otherwise drivingly secured to the output shaft 196 or 197 of a reduction gear set 198 or 199 connected to the output shaft of an electrical synchronous motor 200 or 201. Each of the synchronous motors 200 and 201 is mounted on a shelf or bracket 202 or 203 secured to its respective upright or stanchion 66 or 67 and energized from power lines 204 or 205 respectively, the energization of each of these being controlled by a conventional amplidyne motor generator set (not shown).

Meshing with the screw shafts 190 and 191 are nuts 206 and 207 fixed to the carriages 208 and 209 of two vertical or Y-axis sensing assemblies, generally designated 210 and 211, either of which is optionally convertible into a longitudinal horizontal or Z-axis sensing assembly by rotating its respective sensing head 216 or 217 a quarter turn on its respective shaft 214 or 215, as explained below, so that either assembly 210 or 211 is adapted respectively to trace out either the vertical Y-axis or the longitudinal Z-axis contour of the object, the transverse X-axis contour of which, as stated above, is traced out by the transverse horizontal or X-axis sensing assembly 138, using the terminology of solid analytical geometry. Each carriage 208 or 209 of each of the above sensing assemblies 210 or 211 is generally similar in construction and operation to the construction and operation of the horizontal sensing unit 138. Both of the sensing assemblies 210 and 211 are shown in FIGURE 3 as arranged for vertical or Y-axis tracing, whereas the sensing assembly 211 is shown in FIGURE 11 as arranged, for longitudinal horizontal or Z-axis contour tracing, namely motion in a horizontal plane rather than in the vertical plane shown at either side of FIGURE 3.

Each carriage 208 and 209 is provided with a horizontal bore 212 or 213 of rectangular cross-section reciprocably receiving a horizontal rack bar 214 or 215 (FIGURE 3) of corresponding rectangular cross-section carrying on its inner end a sensing device 216 or 217 similar to the sensing device 160 and upon which a probe or feeler 218 or 219 is pivotally mounted as at 220 and 221. Each probe 218 or 219 is, like the previously-described probe 158, in the form of an arcuate finger, the free end of which engages the side surface of the object O for motion in a horizontal plane as shown in FIGURE 11 or in a vertical plane, when so converted, as described above, as shown in FIGURES 1 and 3.

The outer end of each rack bar 218 or 219 is provided on its opposite sides with sets of rack teeth 222 or 223 and 224 or 225 respectively. Meshing with the first set of rack teeth 222 or 223 is an output pinion 226 or 227 of a reversible electric motor 228 or 229 mounted on the carriage 208 or 209 and energized by electric power lines 230 or 231 through an automatic control circuit of the interconnecting-controlling unit 26, also described below. Meshing with the second set of rack teeth 224 or 225 is a second pinion 232 or 233 similar to the pinion 174 and similarly mounted on the input shaft of a conventional synchro-transmitter 234 or 235 for transverse horizontal dimension-from-center-line (or X-axis) reading, the synchro-transmitter 234 or 235 having output lines 236 or 237 running to the scribing device 30 of the drawing-contacting unit 24, as more fully described below.

Also mounted on each vertical carriage 208 or 209 is a conventional synchro-transmitter 238 or 239, for vertical-dimension (or Y-axis) reading, the input shaft of which has keyed or otherwise drivingly secured thereto a pinion 240 or 241 (FIGURE 3). The pinion 240 or 241 meshes with and is driven by a toothed rack 242 or 243 secured to and extending along the inner side wall 96 of each stanchion or upright structure 66 or 67. The synchro-transmitters 238 and 239 have output lines 244 and 245 running to the scribing device 30 (FIGURE 7) as described more fully below. Finally, the right-hand stanchion or upright structure 67 (FIGURE 3) has secured thereto near the lower end thereof a conventional synchro-transmitter 254 for longitudinal horizontal or fore and aft dimension (or Z-axis) reading. The input shaft of the synchro-transmitter 254 carries a pinion 256 keyed or otherwise drivingly connected thereto and meshing with a toothed rack 258 secured to the upper part of the table or object-supporting structure 42 parallel to the longitudinal axis or direction of motion thereof. The synchro-transmitter 254 has output lines 260 running to the scribing device 30 of the drawing-contacting unit 24, as more fully described below. The details and circuits of such synchro-transmitters, and of the synchro-receivers described below, are well-known to engineers skilled in the servomechanism fields. These are described in detail, for example, in the book "Servomechanism Fundamentals" by Lauer, Lesnich and Matson, published by McGraw Hill Publishing Co., New York, 1947, hence such details are beyond the scope of the present invention.

*Drawing-Contacting Unit*

The drawing-contacting unit 24 is shown for convenience of comprehension as mounted in a vertical position, such as, for example, against a side wall 260 of the building or a partition wall thereof, or any upright surface. It will be evident, however, that one of the advantages of the present invention is that the drawing-contacting unit 24 may be placed any distance away and in a horizontal position, or in an inclined position according to the convenience of installation, since the interconnecting-controlling unit 26 interconnecting the units 22 and 24 is electrical rather than mechanical, as in prior pantographic devices. In actual practice, with regard to large drawings, it may, of course, be more convenient to place the drawings in a horizontal plane rather than in a vertical plane.

The drawing-contacting unit 24 is mounted upon a base or drawing support 262 in the form of a plate having upper and lower bearing bracket lugs or arms 264 and 266 respectively projecting outwardly from the base 262 and bored to rotatably support spaced parallel screw shafts 268 and 270, the upper ends of which carry bevel pinions 272 and 274 meshing with bevel pinions 276 and 278 respectively keyed or otherwise drivingly secured to the opposite ends of a cross shaft 280 rotatably mounted in laterally-spaced bearing lugs 282 also projecting outward from the base plate 262. Drivingly connected to the upper end of the shaft 268 is the output shaft of a reduction gear set 284 which in turn is connected to a reversible synchro receiver 286 having energization lines 288 connected thereto.

Mounted transversely on the screw shafts 268 and 270 and having threaded bores 290 threadedly engageable therewith is a cross beam or carriage 292 provided with a toothed rack bar 294 extending thereacross and also with bearing bores 296 rotatably supporting a transverse screw shaft 298. One outer end of the screw shaft 298 is connected to the output shaft of a reduction gear set 300 which in turn is connected to a reversible synchro receiver 302 energized by lines 304 from a suitable source of electricity in a circuit hereinafter described in more detail. The base 262 is provided with spaced parallel ribs 306, one of which is provided with a toothed rack 308. Meshing with the rack 308 and rotated in response to movement of the cross beam 292 is a pinion 310 on the output shaft of a conventional synchro-transmitter 312 having energization lines 314 connected thereto. The synchro-transmitter 312 is mounted upon and travels with the cross beam 292.

Reciprocably mounted on the cross beam 292 for travel to and fro thereacross is the previously-mentioned scribing device 30. The latter consists of a carriage or movable support 316 having a threaded bore 318 threadedly receiving the screw shaft 298 and beneath it a socket 320 equipped with a set screw 322 and adapted to receive the mounting stem 324 of a scriber 326. The latter includes an elongated barrel 328 in which a pencil lead, pen or other scribing point 330 is mounted in the nose portion 332 thereof and clamped in position by a clamping element 334 at the opposite end thereof. The scribing point 330 is actuated by an electro-magnet (not shown) which, when energized, causes the point 330 to engage the drawing sheet D and inscribe the line L thereon representing the contour being traced by the probes or feelers 158, 218 and 219 upon the top and opposite sides respectively of the object O (FIGURE 3). Mounted upon the carriage 316 is a conventional synchro-transmitter 336, the shaft of which carries a pinion 338 meshing with the toothed rack 294 and rotated in response to any movement of the carriage 316. For the sake of simplicity only, the reproduction system connected to the probe 158 is shown in FIGURE 9, that of the probe 218 in FIGURE 10 and that of the probe 219 in FIGURE 11.

*Interconnecting-Controlling Unit*

The interconnecting-controlling unit 26 which interconnects and controls the object-contacting unit 22 and the drawing-contacting unit 24 is shown in FIGURES 9, 10 and 11 as arranged for automatically scribing a line L, M or N on a drawing sheet D in response to the engagement of the probes 158, 218 or 219 with the object O. In addition to the elements previously described in connection with FIGURES 1 to 8 inclusive and indicated by the same reference numerals in the diagrammatic showing of FIGURE 9, there is provided an electrical control cabinet 342 shown in the central portion of FIGURE 9 and containing the conventional electrical and electronic apparatus and wiring of the interconnecting-controlling unit 26 for electrically interconnecting and controlling the object-contacting unit 22 of FIGURES 1 to 6 inclusive and the drawing-contacting unit 24.

The sensing devices 160, 216 and 217 of the sensing assemblies 138, 210 and 211 and the electronic and electrical circuits and apparatus which are contained in the electrical control cabinets 342 and which in turn control the energization and operation of the reversible electric motors described above are conventional and their details are well-known to electrical engineers and are beyond the scope of the present invention. Briefly described, each sensing device includes a pair of relatively-movable adjacent induction coils, one of which is fixedly mounted in the sensing device 160, 216 or 217 and the other of which is mounted on or connected to the probe 158, 218 or 219 so as to move to and fro relatively to the other induction coil as the probe moves to and fro in following the contour of the object O or other work. The varying current resulting from the change in induction occurring as the result of the relative movement between the two induction coils upsets the balance of a balanced circuit, such as the well-known conventional Wheatstone bridge circuit. The imbalance current resulting from this action is amplified by a conventional amplifier and regulates the output of a conventional amplidyne circuit which in turn controls the input current to the motor 170 (FIGURE 3). In the above-described synchro-transmitter and receiver circuits, the synchro circuit acts as a feed back to the amplidyne unit and also regulates the synchro receiver associated with the scriber 326 by sending the movement of the probe shaft 154, 214 or 215 as the case may be.

FIGURES 9, 10 and 11 show diagrammatically contour reproducing apparatus as combining the model-contacting unit 22 of FIGURES 1 to 6 inclusive with the drawing-contacting unit 24 through the interconnecting-controlling unit 26 included in the electrical control unit 342. FIGURE 9, in particular, shows the making of a drawing line L by the scriber 326 on the drawing D in response to the motion of the probe 158 in moving in the so-called X-axis across the top T of the object O in an approximately horizontal direction; FIGURE 10 shows the making of a drawing line M by the scriber 326 on the drawing D in response to the motion of the probe 218 in moving in the so-called Y-axis approximately vertically up or down the left-hand side S of the object O viewed in FIGURE 3. FIGURE 11 shows the making of a drawing line N by the scriber 326 on the drawing D in response to the motion of the probe 219 in moving in the so-called Z-axis approximately horizontally in a third dimension perpendicular to the plane of the paper in FIGURE 3 or longitudinally along the side S of the object O in FIGURE 1.

*Contour-Establishing Apparatus*

The object-shaping or contour-establishing apparatus, generally designated 28, shown in FIGURE 12 consists almost entirely of the same components and circuits as the structural contour reproducing apparatus 20 of FIGURES 1 to 11 inclusive except that its operation is reversed and the scriber 326 is replaced by a conventional optical line contour follower, generally designated 32, including a scanning device 344 and the sensing head 156, 216 or 217 (FIGURE 3) is replaced by a contouring tool holder 346 constructed and arranged to receive and hold a contouring tool 348 in the form of a cutting tool capable of cutting grooves in the object O. This tool can be rotated in the conventional manner of a milling or routing cutter, should this be necessary in handling hard material.

An optical line or contour follower with a scanning device and the necessary electrical circuit and components, for example, were described in an illustrated article by T. M. Berry entitled "Optical Contour Follower" in the June 1950 issue of the General Electric Review published by the General Electric Company at Schenectady, N.Y. and further described in a pamphlet No. GEC 548 entitled, "G.E. Contour Following System," under No. 8851 published in June 1949, November 1949 and August 1950 by the Apparatus Department of the General Electric Company, Schenectady, N.Y. Briefly described, it consists of a microscope objective and rotary Dove prism system focussed on a photo-electric device. This line follower scans the line L on the drawing D and by balancing the image density on opposite sides of the line maintains a position with its center traveling directly above the line, with a self-correcting action which brings it back to the line whenever any tendency to stray from the line develops. The synchro system shown in FIGURE 12 and described above in connection with FIGURES 1 to 11 inclusive with which it is almost identical, operates the reversible motors 170 and 148 in response to the varying direction of the drawing line L to cause the carriage 136 to travel laterally and the rack shaft 154 to travel up and down (or, in the case of a horizontal contour establishment, in and out) in a manner reversing the action of the apparatus shown in FIGURES 9, 10 and 11. The resulting composite motion applied to the contouring tool 348 forms a groove in the object O' corresponding in contour to the line L in the drawing D, as described below in connection with the operation of this aspect of the invention.

The contour-establishing apparatus 28 of FIGURE 12 is also optionally equipped with a conventional memory device or information-storing device, generally designated 350, connected to the electrical control unit 342 through the conducting cables 352 and 354. The information-storing device 350, at the option of the operator, receives the signals from the synchro-transmitters either of the contour-tracing unit 22 or the drawing-contacting unit 24, and stores it electrically upon a magnetic tape in a conventional magnetic tape recorder of the so-called continuous signal type used for programming machine automation installations without the necessity for interpolation, processing through computers or preparing conventional punched or perforated tapes. Such "memory devices" or information-storing devices 350 are known to electrical engineers concerned with machine automation installations and are available upon the open market, one well-known type being the so-called "Ampro" device. By the use of this information-storing device 350, the contour information received either from the contour tracing unit 22 or from the drawing-scanning unit 24, as the case may be, is received and stored electromagnetically upon magnetic tape in a known manner, where it is available at a future time or in a different location or both, to transmit the information to the drawing-contacting unit 24 for the making of drawings. In a similar manner, the information received from the drawing scanning unit 24 is optionally stored by the memory device 350 and at a subsequent time or in a different location is transferred to the object-shaping unit 28 to establish the desired configuration for the model O' by the action of the contouring tool 348, as described above.

As shown in the upper central portion of FIGURE 12, the conventional memory or information-storing device 350 is also provided with an instrument panel 355 equipped with a series of visual dial indicator instruments, namely a dial 357 which indicates which particular combination of sensing units is operating, a dial 359 which indicates the accuracy being attained in following the course of a drawing line when such is being traced, and three remaining dials 361, 363 and 365 which indicate the numerical values of the X-axis, Y-axis and Z-axis components of the particular point on the model or other object O being traced, measured from the "origin." This "origin" is the selected zero point at which these three axes meet, as in the three-component system of solid analytical geometry. As stated below, the selected location of the origin or zero point of the coordinates varies with the user, and differs between different companies. For purposes of example, it will be assumed herein that the origin or zero point of the three coordinates is located at the point where (FIGURE 3) the longitudinal central plane through the center line C intersects the upper surface 44 of the table 42 immediately below the front axle of the vehicle (FIGURE 2), in accordance with the standard adopted for this purpose by one of the most prominent automobile manufacturing companies.

It will be further understood that the control unit 342 may also be provided with scale-changing mechanism or electrical devices whereby the scale of the drawing from a particular model or the model shaped from a drawing of a particular scale may be enlarged or reduced either by the use of mechanical gearing or by electronic apparatus known to electronic engineers. It will also be evident that the above-mentioned magnetic tape carrying the contour information can be used in other fabricated machines to shape models, providing they have the identical or corresponding drive and synchro mechanisms as described above. It will also be evident that the same machine, instead of operating upon clay models to reproduce contours can, by its cutter 348 (FIGURE 12) cut templates, die models, gauges and assembly fixtures of equivalent contours or silhouettes.

In the foregoing specification, the details of construction, circuits and operation of the synchro-transitters and receivers have been omitted because these devices are conventional and their details are well-known to electrical engineers skilled in servo systems and hence are beyond the scope of the present application. A description of the details of construction, wiring and operation of such servo devices is given, for example, in the well-known book "Servomechanism Fundamentals" by Lauer, Lesnick and Matson published by McGraw-Hill Book Co., New York, first edition 1947, following page 26 therein.

*Operation of the Contour-Reproducing Apparatus*

In the operation of the contour-reproducing apparatus 20 shown as a whole in FIGURES 9, 10 and 11 and in its three general units, namely the model-contacting unit 22 in FIGURES 1 to 6 inclusive, the drawing-contacting unit 24 in FIGURES 7 and 8, and the motion-reproducing unit 26 in FIGURES 9, 10 and 11, let it be assumed that an object O, such as a model, has been prepared, from which it is desired to make detailed drawings. In particular, let it be assumed, for purposes of illustration, that a three-dimensional full-size model of an automobile body has been prepared by body design engineers from clay or other suitable material, that the management of the company has approved the design of the model and that it is to be reduced to two-dimensional drawings showing the contours of the model in both horizontal and vertical planes at a given separation, such as the 10-inch separation for the so-called "cube lines" used by certain companies in the automobile industry.

The apparatus 20 is first indexed by setting the sensing probe 158 on the center line C (FIGURE 3) at the top of the object O, the so-called synchro scales being read to position the probe 158 in space. These synchro scales are aids for the operator to facilitate locking the feed and the sensing motions between the probe and the scriber. Such a synchro scale can consist, for example, of a scale positioned on the cross-beam 104, in such a manner that when the probe is exactly on the centerline of the model, the indicator point will read "O" on the scale. By adjusting the phase shift of the particular synchro receiver, the operator moves the point 330 of the scriber 326 manually to a location exactly on the centerline of the drawing. A similar synchro scale is attached to the probe shaft 154 in such a manner that when the probe is a known distance away from the press plate 42, the indicator on the scale will read the same distance. By reading the scale, therefore, after the probe has contacted the model, the operator can inform the draftsman as to how high the scriber should be on the drawing. After these two positions for each probe have been locked with the corresponding motions of the scriber, the draftsman is assured that the line being drawn upon the paper sheet on the base or bed plate 262 is located correctly in relation to other lines thereon. The draftsman or other operator then secures a sheet of drawing paper D to the base or bed plate 262 (FIGURES 7 and 8) and positions the point 330 of the scriber 326 also on the center line C' of the drawing D. These adjustments are made by means of manual adjustment of rheostats (not shown) in the motor circuits until the above point-to-point correspondence is obtained. The starting point for the taking of the first contour trace is optional with the user and the practice varies with the different companies. One company, for example, starts at the front axle as a point of reference for the Z-axis while another starts at the dash panel for the same point of reference.

The operator now energizes the various circuits and starts the carriage 136 in motion to the left from the intersection of the center line C (FIGURE 3) with the top of the model or other object O. As the carriage 136 of the sensing unit 138 moves to the left, the tip of the probe 158 follows the contour of the top T of the object O until it reaches the corner of the top T and the side S thereof. The variation of the position of the probe 158 by its rise or fall is communicated through the corresponding variation in induction between the induction coils contained in the sensing device 160 to the synchro circuit which controls the actuation of the reversible motor 170 to rotate the pinion 168 and move the probe shaft 154 upward or downward as called for by the varying position of the tip of the probe 158.

By energizing the motor 148, the screw 140 is turned, through bevel gears 142 and 144. This screw propels the carriage 136 from the starting point at the centerline of the model, for instance, to the left-hand side of the drawing in a slow motion regulated by the operator as to speed. The gear train, motor, and the motion produced by them is called the "Feed Motion" because it feeds the probe 158 over a cross-section of the roof panel. The probe 158, starting at the centerline, which is the highest point of the body shown in the drawing, will immediately "sense" that the line is curving away from a horizontal line and through a change of a magnetic field, embodied in the box 160, will unbalance a circuit in the master control panel 342 shown in FIGURE 12.

This unbalance will cause in the circuitry of the control panel an energization proportional to the unbalance, thereby producing a flow of current to the motor 170 which, acting through the pinion 168, will lower the rack 164 and the probe box 160 until the probe 158 indicates that it has returned to the normal position, causing the magnetic field to balance out and shutting off the current to the motor 170. The motion produced by this last-mentioned drive may be called the "sensing motion." Because the sensitivity of the probe 158 is very great, it will hold its relationship to the contour of the model very accurately in practically a continuous drive of the "sensing motion" while the probe 158 is being "fed" over the contour by the "feed motion" described above. It will be understood that the control of the speed of the "feed motion" is in the hand of the human operator through a remote control pendent (not shown), whereas the "sensing motion" is wholly controlled by the steepness of the curvature of the surface of the model O.

After the operator has thus achieved the desired relationship between the probe 158 and the curvature of the top section T on the model O, he measures the drop of the rack 164, as an indication of the "sensing motion," from the starting position at the highest point at the center line for each turn of the screw 140 of the feed motion. By the synchronization of the motor 148 (FIGURE 3) with the motor 302 (FIGURE 7), the "feed motion" of the carriage 136, which carries the probe mechanism, becomes identical with the "feed motion" of the carriage 316, which carries the scriber 326. By the synchronization of the motor 170 (FIGURE 3) with the motor 286 (FIGURE 8), the "sensing motion" of the rack 164, carrying the probe 158 (FIGURE 3) becomes identical with the "sensing motion" of the cross beam 292 (FIGURE 7) carrying the scriber 330. The sensitivity of the synchro transmitter 180 (FIGURES 3 and 4) meshing into the rack 186 and that of the synchro transmitter 336 (FIGURE 7) meshing into the rack 294 (FIGURE 7) locks the two "feed motions" in step. The sensitivity of the synchro transmitter 176 (FIGURE 3) meshing into the rack 166 and that of the synchro transmitter 312 (FIGURE 7) meshing into the rack 308 locks the two "sensing motions" in step. By thus assuring that all carriages are moving in unison, it is obvious that the scriber point 330 draws on the drawing D an exact replica of the sectional curve of the actual model O.

The circuits of the different probes are selectively connected by manual switching by the operator to the circuits of the scriber carriages in such a way that the four quadrants of the XYZ axis system are fully covered. Each time the circuit of a different probe is connected to the circuit of the scriber, the probe and the scriber systems must be balanced out and "zeroed" by the manual adjustments described herein. The zero point can be arbitrarily fixed by the operator anywhere in space within the reach of the particular probe being used, provided that the so-called "synchro scales" can be read accurately by the operator so that the draftsman can also accurately position the scriber in the drawing.

The synchro transmitters and receivers thus act as watchdogs to assure that the various "feed motions" are locked in step between the probe and scriber, and that the various "sensing motions" are also locked in step between probe and scriber. By this arrangement, any slippage of each pair of synchronous driving motors will be immediately compensated, as will also be over-runs or under-runs of each pair of motors.

When the corner is reached between the top T and side S of the object O, the operator halts the sensing unit 138, aligns the tip of the probe 218 of the sensing head 216 with the point reached by the tip of the probe 158 at the said corner, and starts the carriage 208 of the sensing unit 210 in operation vertically downward in response to the rotation of the screw shaft 190, the motion of the tip of the probe 218 in following the contour of the side S of the object O is again transmitted through the variation in relative position of the induction coils within the sensing devise 216 to the synchro system which, in a manner analogous to that described above for the sensing device 160, regulates the action of the reversible motor 228 to move the probe shaft 214 inward or outward with a self-balancing servo-action which causes the tip of the probe 218 to accurately trace the contour in the selected vertical plane down the side S of the object O until the bottom thereof is reached. Meanwhile, the motion of the probe 218 as transmitted by the synchro transmitters 238 and 234 is communicated to the scribing unit 30 through its reversible synchro receivers 286 and 302 controlled in feedback through the synchro transmitters 312 and 336 to move the scriber carriage 316 along the cross beam 290 and at the same time move the cross beam 290 bodily along the screw shafts 268 and 270 to trace out the left-hand side portion of the line L corresponding to the left-hand side S of the object O.

The operator then completes the line L of the drawing D, if so desired, by reversing the foregoing procedure, again starting the probe 158 at the intersection of the center lines C with the top T of the object O reversed as shown in the dotted lines in the central portion of FIGURE 3, and moving the carriage 136 of the sensing unit 138 to the right to the corner of the object O between the side S and the top T, tracing out the corresponding portion of the line L on the drawing D to the right of the center line C′ thereof (FIGURE 7). The operator then halts the sensing unit 138, positions the sensing unit 211 with the tip of its probe 219 at the same position on the corner of the object O reached by the tip of the sensing unit 158, and causes the sensing unit 211 to move downward and its sensing head shaft 215 to move in and out in response to the same action as described above in connection with the sensing units 138 and 210. This motion, transmitted through the synchro circuit, traces out the right-hand side portion of the drawing line L of the drawing D as viewed in FIGURE 7. If, however, the right-hand side of the model is to be exactly symmetrical about its center line, there would be no need to trace this portion of the line.

The operator now shifts the gantry 70 to the next location at which it is desired to make the next contour drawing, by manually controlling the motors 78 (FIGURE 3) which move the gantry 70 lengthwise along its tracks 90 (FIGURE 1) until the desired location is reached. The foregoing procedure is then repeated to obtain a new drawing with a new contour line L for each selected vertical transverse plane, as described above.

After the contour line drawings of the transverse vertical planes have been obtained at the desired intervals, the operator then obtains the horizontal section contour line drawings in an analogous manner. To obtain the longitudinal contour line drawings in the various planes of the tip T of the object O, he employs the sensing unit 138 and probe 158 to follow the top contour T while employing the motors 78, controlled by the synchro transmitter and the synchro circuit connected thereto (FIGURE 11) to move the gantry 70 lengthwise relatively to the table 44 and the object O placed thereon in order to trace out a contour line coresponding to each selected contour plane or section plane. The circuit is similar to that shown in FIGURE 11, with the sensing unit 138 substituted for the sensing unit 211 shown in FIGURE 11. After the longitudinal contour lines have been obtained at the selected longitudinal planes, located by setting the carriage 136 at selected intervals along the cross beam 104 by means of manual control of the electric motor 148 in rotating the screw shaft 140, the operator then employs the sensing unit 211 in teh circuit shown in FIGURE 11 to reproduce the longitudinal side contours of the sides S and S′ of the object O in horizontal planes at selected vertical intervals to obtain a set or family of horizontal contour lines P on the drawing D shown in FIGURE 11.

The operation of the auxiliary or end-contacting unit 133 is somewhat similar to that described above for the unit 138 with the exception of the fact that the motion of the sensing heads 149 and 151 and their guide shaft 147 is horizontally back and forth along the longitudinal or Z-axis in order to trace the horizontal and vertical contours of the opposite ends of the model O, the sensing 149 and feeler 157 used on the forward end of the model and the sensing head 151 and feeler 159 on the rearward end of the model. Let it first be assumed that the contours of the ends of the model O are first to be traced and recorded in a series of horizontal planes, after which the procedure will be described for tracing and recording the contours of the ends of the model O in a succession of vertical planes.

For tracing and recording a horizontal end contour of the model O (FIGURE 13), the operator energizes the various circuits as described above in connection with the operation of the sensing unit 138, and positions the gantry or upright structure 70 along its guide rails 90 so that the cross beam 104 is located immediately in front of and above the front end E of the model O. The cross beam 104 is moved upward or downward along the stanchions 66 and 67 until it is positioned at the proper horizontal level to place the end of the feeler 157 of the sensing head 149 at the desired horizontal plane in which the contours are to be traced and recorded. In order to have free space for operations, the operator moves the cross carriage 136 of the sensing unit 138 to its extreme left-hand position along the cross beam 104 (FIGURE 3). The operator now energizes the circuits necessary to move the carriage 137 so as to position the end of the feeler 157 at its starting point, namely its intersection with the central vertical longitudinal plane shown by the chain lines in the center of FIGURE 1. The operator then energizes the various circuits and starts the carriage 137 in motion, for example, to the left from the intersection of the central plane or center line C in FIGURE 3, causing the tip of the probe or feeler 157 to follow the contour of the front end E of the model O horizontally until it reaches the front corner to the left in FIGURE 3 which, from the car driver's viewpoint is designated as the right front corner of the vehicle. As the carriage 137 moves transversely along the cross beam 104 in this manner, in response to the rotation of the screw shaft 140, the sensing head 149 and its probe 157 together with the shaft 147 (FIGURE 13) are moved back and forth in response to the varying contour of the front end E in the selected horizontal plane, as actuated by the reversible motor 167 through the interconnecting system 26 in response to the signals sent out by the synchro-transmitter 173 through its output line 175. While this is occurring, as previously stated, the variation of the position of the probe 157 by its motion inward or outward and the corresponding variation in induction between the induction coils contained in the sensing head 149, controls the actuation of the reversible motor 167 to rotate the pinion 165 and move the probe-carrying shaft 147 inward or outward as called for by the varying positions of the tip of the probe 157.

When the corner of the front end of the body is reached in this manner in the selected horizontal plane, if the front end is symmetrical, the operator does not need to trace out the contour on the opposite side of the center line of the front end, but if it is asymmetrical, he does so in a similar manner. He then raises or lowers the cross beam 104 by rotating its screw shafts 110 (FIGURE 3) to select a new horizontal plane in which the contours are to be traced, and repeats the foregoing procedure. Meanwhile, in the manner explained above, the drawing-contacting unit 24 shown in FIGURES 7 and 8, has recorded on the drawing D the contours traced out on the front end E as described above. The operator then repeats the foregoing operation to trace and record the contours in as many vertically-spaced horizontal planes as the particular project requires.

To record the contours of the front end E in spaced vertical planes (FIGURE 13) the operator moves the cross carriage 137 of the sensing unit 133 along the cross beam 104 to the starting point, generally in the central vertical longitudinal plane at the selected point of departure, also rotating the sensing head 149 a quarter turn or 90 degrees in order to properly position it for travel vertically. He then holds the cross carriage 137 in this position while he operates the motor 126 and screw shafts 110 to move the cross beam 104, the probe shaft 147, probe 157 and sensing head 149 moving inward or outward in response to the action of the reversible motor 167 controlled by the synchro-transmitter 173 in response to the varying induction set up between the fixed and movable induction coils within the sensing head 149. The apparatus 24 of FIGURES 7 and 8 then transfers this vertical contour line to the drawing D in the manner previously described above, after which the cross carriage 137 is moved to successive spaced positions along the cross beam 104 and the foregoing procedure repeated in order to trace and record the contours in spaced vertical planes in the so-called Y-axis position, as described above.

In the operation of the model-shaping or contour establishing apparatus 28 shown in FIGURE 12, the operator removes the scriber 326 and replaces it by the line contour scanner 344 of the line following device 32 and its accompanying apparatus, and also removes the sensing head 156 from the horizontally-moving sensing device 138, replacing it by the contouring tool holder 346 containing the contouring tool 348. The line contour scanner 344 of the line follower 32 is then set on the center line C′ of the drawing D at its intersection with the line L by manually controlled adjustment of the motors 286 and 302 and the contouring tool 348 is set at the same intersection of the top T′ of the rough model M′, and its center line C (FIGURE 12), by similar manually-controlled operation of the electric motors 148 and 170.

With the system thus set at corresponding starting points, the operator starts the "feed motion" by energizing the motor 302 which through the screw 298 moves the carriage 316 and the line-follower 344. The corresponding synchronous motor 148 turns the screw 140, moving the carriage 138, carrying the cutter 348, at the exact same speed and in the same direction, whereupon the carriage 316 travels to the left and the scanner 344 automatically follows the line L of the drawing D while the synchro system connected to the line contour follower 32 automatically controls the corresponding travel of the carriage 136 and shaft 154 thereon to cause the tip of the contouring tool 348 to cut in the rough object or model M′ a groove, the bottom of which corresponds in contour to the drawing line L at the selected plane of the object.

By using only the right-hand portion of each curve, a body can be made exactly symmetrical about a center line; by reversing the travel of the feed motions the left-hand side can be generated from the right-hand portions of all applicable curves, and vice versa.

The operator repeats this procedure at the desired number of selected planes both horizontal and vertical, transverse and longitudinal, until the rough object or model M′ has been completely grooved in correspondence with the sets of families of drawings D. A workman then removes the intervening stock from the rough model M′ between the various thus-established contour grooves to obtain the resulting contour and finished configuration of the object or model M.

It will be evident that in the contour-reproducing apparatus 20 of FIGURES 1 to 6 inclusive, the relative motion between the gantry 70 and the object supporting table 42 may be reversed from that shown, namely by fixedly mounting the gantry 70 on the floor 36 and by providing rollers on the table 42 engaging guide tracks on the floor structure, the table 42 being thereby slidably mounted for travel along the guide tracks instead of being stationarily mounted relatively to a moving gantry, as shown in FIGURES 1 to 6 inclusive. This modification is therefore a reversal of elements of the construction shown in FIGURES 1 to 6 inclusive.

What I claim is:

1. A contour-reproducing apparatus for automatically tracing out the contour of an object while simultaneously transferring the traced contour to a drawing, said apparatus comprising an object-holding structure, a frame structure disposed adjacent said object-holding structure, a tracer carriage movably mounted on said frame structure for travel substantially parallel to said object-holding structure, a sensing device support movably mounted on said tracer carriage for travel substantially perpendicular to said object-holding structure, a sensing device mounted on said support and having a movable tracer feeler engageable with said object, a tracer-carriage-moving motor drivingly connected to said tracer carriage for moving said tracer carriage relatively to said frame structure, a sensing-device-support-moving motor drivingly connected to said sensing device support for moving said sensing device support relatively to said tracer carriage, a drawing carrier spaced apart from said frame structure, a scriber carriage movably mounted on said drawing carrier for travel substantially parallel to said drawing carrier, a scriber support movably mounted on said scriber carriage for travel substantially perpendicular to the direction of travel of said scriber carriage, a scribing device mounted on said scriber support and having a scriber thereon disposed in scribing engagement with a drawing on said drawing carrier, a scriber-carriage-moving motor drivingly connected to said scriber carriage for moving said scriber carriage relatively to said drawing carrier, a scriber-support-moving motor drivingly connected to said scriber support for moving said scriber support relatively to said scriber carriage, synchro-actuated motor-contolling means electrically connecting said sensing device to said sensing-device-support-moving motor and responsive to the object-contour-tracing motion of said feeler for effecting follow-up operation of said last-mentioned motor to maintain said feeler in substantially tracing engagement with the object and motion transmitting means for effecting motion-reproducing operation of said scriber-carriage-moving motor and said scriber-support-moving motor to move said scribing device and scriber relatively to said drawing carrier in a path of travel having substantially point-for-point correspondence with the path of travel of said feeler upon the object.

2. A contour-reproducing apparatus, according to claim 1, wherein one of said structures is mounted for movement relatively to the other structure and wherein motor-driven means is drivingly connected to said one structure for moving said one structure relatively to said other structure, whereby to shift the plane of engagement of said feeler with the object.

3. A contour-reproducing apparatus, according to claim 1, wherein said motion-transmitting means includes a synchro-transmitter mounted on said tracer carriage in operated engagement with said frame structure and a synchro-receiver mounted on said scriber carriage and connected to said scriber support in operation-controlling relationship with said scriber support.

4. A contour-reproducing apparatus, according to claim 1, wherein said motion-transmitting means includes a synchro-transmitter mounted on said tracer carriage in operated engagement with said sensing device support and a synchro-receiver mounted on said scriber carriage and connected to said drawing carrier in operation-controlling relationship with said scriber carriage.

5. A contour-reproducing apparatus, according to claim 1, wherein said frame structure comprises a gantry structure overhanging said object-carrying structure and wherein said tracer carriage depends from said gantry structure.

6. A contour-reproducing apparatus, according to claim 1, wherein said frame structure comprises a gantry structure with spaced uprights and a tie member therebetween and wherein a cross member is movably mounted on said uprights substantially parallel to said tie member, said tracer carriage being movably mounted on said cross member.

7. A contour-reproducing apparatus, according to claim 6, wherein motor-driven mechanism is provided for moving said cross member along said uprights.

8. A contour-reproducing apparatus, according to claim 1, wherein said drawing carrier is provided with a pair of spaced parallel scriber carriage propelling members and wherein said scriber carriage comprises a bridge member having its opposite ends guidedly engaging said propelling members and wherein said scriber support is movably mounted on said bridge member for travel therealong.

9. A contour-reproducing apparatus, according to claim 8, wherein said propelling members comprise a pair of screw shafts threadedly engaging the opposite ends of said bridge member and wherein said scriber-carriage-moving motor is rotatingly connected to said screw shafts.

10. A contour-reproducing apparatus, according to claim 9, wherein a third screw shaft is rotatably mounted on said bridge member in threaded engagement with said scriber support and wherein said scriber-support-moving motor is rotatingly connected to said third screw shaft.

11. A contour-reproducing apparatus, according to claim 6, wherein the tracer carriage is horizontally movable along the cross-member.

12. A contour-reproducing apparatus, according to claim 11, wherein a cross-member-operating screw shaft is rotatably mounted on one of said uprights and threadedly engages the cross member.

13. A contour-reproducing apparatus, according to claim 6, wherein motor-driven means is provided for moving the gantry structure relatively to the object-holding structure and wherein a synchro-transmitter is associated with said motor-driven means and operatively engages said object-holding structure.

14. A contour-reproducing apparatus, according to claim 13, wherein a trackway is mounted adjacent the object-holding structure and wherein the gantry uprights travel along said trackway.

15. A contour-reproducing apparatus, according to claim 1, wherein said object-holding structure includes a substructure, a vertically-disposed pivot unit mounted on said substructure, and a turntable adapted to support the object mounted on said pivot unit.

16. A contour-reproducing apparatus, according to claim 1, wherein said motor-controlling means includes an electro-magnetically-operated information-storing device arranged to receive and store upon a magnetic tape contour configuration information, and also includes means for translating said information electrically into operation-controlling motor guidance impulses.

17. A contour-reproducing apparatus, according to claim 1, wherein visual indicating means is also provided including an indicator instantaneously showing the numerical values of the point instantaneously being traced along each of the X, Y and Z coordinate axes from the origin thereof together with an indicator showing which two of the three coordinate axes are being reproduced at the moment, and also an indicator showing the tracing accuracy instantaneously being attained.

References Cited in the file of this patent

UNITED STATES PATENTS

| | | |
|---|---|---|
| 2,305,167 | Kasper | Dec. 15, 1942 |
| 2,475,245 | Leaver et al. | July 5, 1949 |
| 2,494,663 | Lobosco | Jan. 17, 1950 |
| 2,499,178 | Berry et al. | Feb. 28, 1950 |
| 2,508,468 | Rathje | May 23, 1950 |
| 2,677,310 | Campbell | May 4, 1954 |
| 2,721,989 | Gates et al. | Oct. 25, 1955 |

FOREIGN PATENTS

| | | |
|---|---|---|
| 121,863 | Australia | Aug. 8, 1946 |
| 1,091,966 | France | Nov. 3, 1954 |